United States Patent
McGinnis et al.

(10) Patent No.: US 11,858,179 B2
(45) Date of Patent: Jan. 2, 2024

(54) THERMALLY EXPANDING MANDREL FOR CAST COMPONENTS

(71) Applicant: Amazon Technologies, Inc., Seattle, WA (US)

(72) Inventors: Steven McGinnis, Seattle, WA (US); Kader Chellabi, Seattle, WA (US); Prescott Gee Glynn, Sammamish, WA (US); Adrian Timothy Wallace, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 447 days.

(21) Appl. No.: 15/871,549

(22) Filed: Jan. 15, 2018

(65) Prior Publication Data

US 2019/0217508 A1    Jul. 18, 2019

(51) Int. Cl.
*B29C 33/52*  (2006.01)
*B29C 70/44*  (2006.01)
*B29C 43/36*  (2006.01)
*B29C 33/54*  (2006.01)
*B29C 33/42*  (2006.01)
(Continued)

(52) U.S. Cl.
CPC ............ *B29C 33/52* (2013.01); *B29C 43/361* (2013.01); *B29C 43/3642* (2013.01); *B29C 70/44* (2013.01); *B29C 33/42* (2013.01); *B29C 33/54* (2013.01); *B29C 2043/3261* (2013.01);
(Continued)

(58) Field of Classification Search
CPC ......... B29C 33/52; B29C 33/54; B29C 70/44; B29C 43/36; B29C 33/42; B29C 43/361; B29C 44/58; B29C 33/48; B29C 33/76; B29C 44/06; B29C 44/12; B29C 33/00; B29C 70/36; B29C 70/48; B29C 70/34; B29C 70/16; B29C 33/3807; B22C 9/02; B22C 33/38; B22C 33/52; C04B 28/26;
(Continued)

(56) References Cited

U.S. PATENT DOCUMENTS 2,199,006 A    4/1940   Minor
3,921,306 A    11/1975  Provi
(Continued)

FOREIGN PATENT DOCUMENTS

DE    1953798 U    1/1967
EP    0415207 A2 *  3/1991    ............. B29C 43/32
GB    1478376 A    6/1977

*Primary Examiner* — Galen H Hauth
*Assistant Examiner* — Shibin Liang
(74) *Attorney, Agent, or Firm* — Athorus, PLLC

(57) ABSTRACT

Lightweight and strong components having any desired shape, form, or geometry may be manufactured using thermally expanding mandrels by the processes described herein. A thermally expanding mandrel may be formed from an expanding material composition including thermally expanding particles, e.g., micronized rubber particles, and water-soluble binder material, e.g., gypsum plaster. Component material may be applied to the mandrel, and the mandrel may be inserted into a molding tool. Upon application of heat to the mandrel, the mandrel may expand, and compress and cure the component material into a component within the molding tool. Following formation of the component, the mandrel may be washed out of the component, e.g., using pressurized water, and the expanding material composition may be recycled and/or reused.

19 Claims, 8 Drawing Sheets

(51) Int. Cl.
  *B33Y 80/00* (2015.01)
  *B29C 43/32* (2006.01)
  *B29L 31/30* (2006.01)

(52) U.S. Cl.
  CPC ............... *B29C 2043/3668* (2013.01); *B29L 2031/3085* (2013.01); *B33Y 80/00* (2014.12)

(58) Field of Classification Search
  CPC ......... B28B 7/34; B28B 7/346; B28B 13/021; B29B 7/00
  See application file for complete search history.

(56) References Cited

U.S. PATENT DOCUMENTS

| | | | |
|---|---|---|---|
| 4,043,721 A | | 8/1977 | Lemelson |
| 4,292,101 A | | 9/1981 | Reichert |
| 5,687,652 A | | 11/1997 | Ruma |
| 6,071,591 A | | 6/2000 | Dausch |
| 6,828,373 B2 * | | 12/2004 | Artz .................. B28B 7/46 249/175 |
| 9,314,941 B2 * | | 4/2016 | Wallen ................ B28B 7/346 |
| 2003/0034588 A1 * | | 2/2003 | Miura ................ B29C 43/10 264/258 |
| 2003/0059567 A1 | | 3/2003 | Cediel et al. |
| 2005/0064128 A1 | | 3/2005 | Lane et al. |
| 2011/0000398 A1 * | | 1/2011 | Wallen ................ B33Y 10/00 106/614 |
| 2011/0024350 A1 | | 2/2011 | Entezarian et al. |
| 2014/0102578 A1 * | | 4/2014 | Bartel ................ B29C 70/462 138/123 |
| 2016/0354968 A1 | | 12/2016 | Rodriguez et al. |
| 2017/0087745 A1 * | | 3/2017 | Cawthorne ............. B32B 3/02 |

* cited by examiner

THERMALLY EXPANDING MANDREL FOR CAST COMPONENTS

BACKGROUND

Various components may be cast or molded using mandrels within molding tools. Generally, such mandrels must be designed to facilitate their removal from the interior of the cast or molded components. Thus, cast or molded components having more complex shapes or forms may not be manufactured using these methods if the mandrels cannot subsequently be removed from the components. Accordingly, there is a need for systems and methods to create cast or molded components having any desired shapes or forms using mandrels within molding tools.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1A:
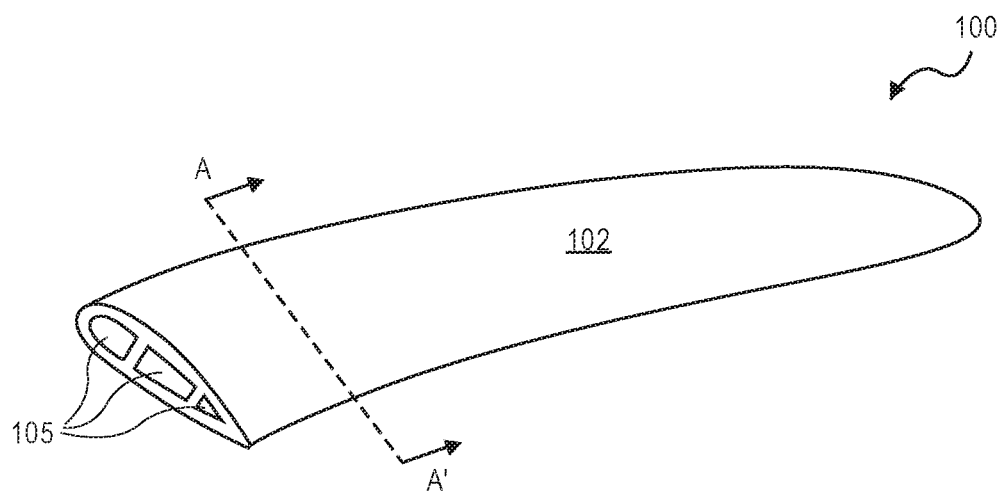
FIG. 1A is a schematic, perspective view diagram of a cast or molded component, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Systems and methods to form cast or molded components using self-skinning foam materials having one or more negative space spars are described. In addition, systems and methods to form cast or molded components having one or more surfaces with resin coatings are also described. Further, systems and methods to form cast or molded components having any desired shapes or forms using thermally expanding mandrels are described.

In example embodiments, various cast or molded components, such as wings, beams, or other components for aerial vehicles, may be formed using self-skinning foam materials by the systems and methods described herein. For example, a wing may be formed using a self-skinning foam material composition that is injected into a molding tool. In addition, the wing may include one or more negative space spars that are formed using one or more mandrels inserted into the molding tool. During expansion and curing of the self-skinning foam material composition, an external skin may be formed on an exterior surface of the wing, and/or one or more internal skins may be formed on interior surfaces of the one or more negative space spars. The one or more negative space spars may reduce material usage and weight of the wing, while the external skin and/or internal skins may increase structural strength of the wing.

In other example embodiments, various cast or molded components, such as wings, beams, or other components for aerial vehicles, may be formed having one or more surfaces with resin coatings by the systems and methods described herein. For example, a wing may be formed using a foam material composition that is injected into a molding tool. In addition, the wing may include one or more negative space spars that are formed using one or more mandrels inserted into the molding tool. Further, the molding tool and/or the one or more mandrels may include resin coatings that are applied on their respective surfaces. During expansion and curing of the foam material composition, the resin coatings may also be cured, e.g., by application of heat, such that an external skin may be formed from a resin coating on an exterior surface of the wing, and/or one or more internal skins may be formed from resin coatings on interior surfaces of the one or more negative space spars. The one or more negative space spars may reduce material usage and weight of the wing, while the external skin and/or internal skins may increase structural strength of the wing.

In additional example embodiments, the external skin formed on an exterior surface of a component and/or the internal skins formed on interior surfaces of the one or more negative space spars of a component may also include various surface features, such as corrugations, ribs, striations, protrusions, bumps, indentations, dimples, or other surface features, or combinations thereof. The various surface features may be formed from corresponding surface features on the molding tool and/or the one or more mandrels, and such surface features may further increase the structural strength of cast or molded components.

In further example embodiments, various cast or molded components, such as wings, beams, or other components for aerial vehicles, may be formed using thermally expanding mandrels by the systems and methods described herein. For example, a thermally expanding mandrel may be formed from a thermally expanding material composition, such as micronized rubber particles and gypsum plaster. The thermally expanding mandrel may be formed in any desired shape or form. Then, component material, such as carbon fiber strips or tape, may be applied to the thermally expanding mandrel and inserted into a molding tool. Upon the application of heat to the thermally expanding mandrel and/or the molding tool, the mandrel may expand and apply pressure to the component material, and the component material may be cured to form the component. Upon completion of expansion and curing of the component, the component may be removed from the molding tool, and the thermally expanding material composition of the thermally expanding mandrel may be washed out of the component, e.g., using water, and at least partially reused or recycled in the systems and methods described herein. The thermally expanding mandrel may allow the formation of components having any desired shape or form within molding tools, while also facilitating reuse and/or recycling of the thermally expanding material composition.

FIG. 1A is a schematic, perspective view diagram of a cast or molded component 102, according to an implementation 100.

In example embodiments, the cast or molded component 102 may be a wing, beam, or other component of an aerial vehicle. In other example embodiments, the cast or molded component 102 may be any other component, e.g., a beam, spar, rod, tube, or other component, of any other type of vehicle, machine, structure, device, or system. Although FIGS. 1A-1E depict an example wing as the cast or molded component 102, the systems and methods described herein are not limited to wings or other components of aerial vehicles.

The cast or molded component 102 may be formed from a foam material composition, e.g., urethane or polyurethane foams. In example embodiments, the foam material composition may be an expanding foam material that expands and cures substantially at room temperature. For example, the foam material composition may expand and cure without the application of heat to the foam material composition. In alternative embodiments, the foam material composition may be an expanding foam material that expands and cures upon application of heat. For example, the foam material composition may expand and cure at a faster rate upon application of heat as compared to the rate of expansion and curing substantially at room temperature.

In further example embodiments, the foam material composition may be a self-skinning foam material composition. For example, upon expansion of the foam material composition that results in a pressure increase at interfaces between the foam material composition and one or more surfaces of a molding tool and/or between the foam material composition and one or more surfaces of one or more mandrels inserted into the molding tool, an external skin may be formed on an exterior surface of the component 102 and/or one or more internal skins may be formed on one or more interior surfaces of the component 102.

Example foam material compositions may include four-pound self-skinning foams, two-pound self-skinning foams, or other types of self-skinning foams. For example, a four-pound foam indicates an expansion ratio of approximately four pounds per cubic foot, a two-pound foam indicates an expansion ratio of approximately two pounds per cubic foot, etc. In some example embodiments, self-skinning foams may form skins on their exterior surface facing a molding tool, or interior surfaces facing mandrels, upon generation of at least approximately 10% overvolume pressure within a molding tool. In alternative embodiments, different percentages of overvolume pressure may be generated within the molding tool, e.g., approximately 5%, approximately 8%, approximately 12%, or approximately 15%, or within a range of approximately 5% to approximately 20% overvolume pressure.

In some example embodiments, the foam material composition may be modified with the addition of water or other additives to affect the expansion ratio. For example, the addition of approximately five drops of water to approximately 160 grams of two-pound self-skinning foam may increase the expansion ratio by approximately 30%.

As shown in FIG. 1A, the cast or molded component 102 may also include one or more negative space spars 105. The negative space spars 105 may be formed by the insertion of one or more mandrels into a molding tool that forms the cast or molded component 102. Each of the negative space spars 105 may have any desired shape based at least in part on a shape of a corresponding mandrel. Although FIG. 1A shows three negative space spars 105 within the cast or molded component 102, any other number or arrangement of negative space spars 105 may be included in the component 102. For example, the component 102 may include only a single negative space spar 105 in any position, or the component 102 may include multiple negative space spars in any arrangement.

In example embodiments, the negative space spars 105 may reduce material usage and weight of the component 102. Further, by forming the component 102 using a self-skinning foam material composition, one or more skins may be formed on an exterior surface and/or one or more interior surfaces, and the one or more skins may increase structural strength of the component 102. For example, interlaminar shear strength between the one or more skins and other portions of the foam material composition may contribute to the increased structural strength of the component 102.

Figure 1B:
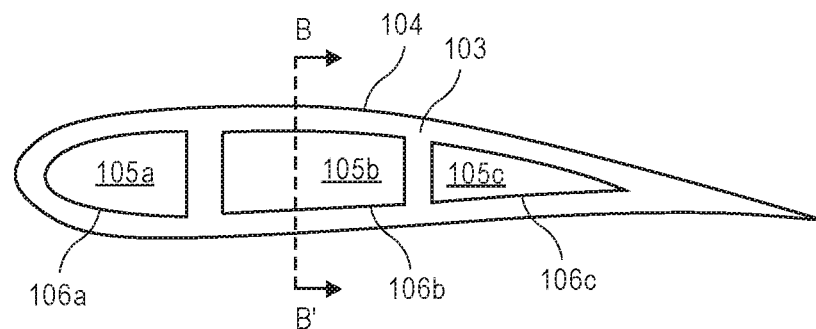
FIG. 1B is a schematic, cross-sectional view diagram of a cast or molded component taken along line A-A' shown in FIG. 1A, according to an implementation.

FIG. 1B is a schematic, cross-sectional view diagram of a cast or molded component 102 taken along line A-A' shown in FIG. 1A, according to an implementation.

FIG. 1B shows a component 102 formed of a foam material composition 103, e.g., a self-skinning foam material composition. An external skin 104 may be formed on an exterior surface of the component 102 upon expansion and curing of the foam material composition that results in a pressure increase at an interface between the foam material composition and surfaces of a molding tool.

In addition, as shown in FIG. 1B, the component 102 may include three negative space spars 105a, 105b, 105c formed by the insertion of corresponding mandrels into the molding tool. Three internal skins 106a, 106b, 106c may be formed on interior surfaces of the three negative space spars 105a, 105b, 105c of the component 102 upon expansion and curing of the foam material composition that results in a pressure increase at interfaces between the foam material composition and surfaces of corresponding mandrels.

In example embodiments, the negative space spars 105a, 105b, 105c may reduce material usage and weight of the component 102. Further, by forming the component 102 using a self-skinning foam material composition, an external skin 104 may be formed on an exterior surface and one or more internal skins 106*a*, 106*b*, 106*c* may be formed on one or more interior surfaces, and the one or more skins 104, 106*a*, 106*b*, 106*c* may increase structural strength of the component 102. For example, interlaminar shear strength between the one or more skins and other portions of the foam material composition may contribute to the increased structural strength of the component 102.

Figure 1C:
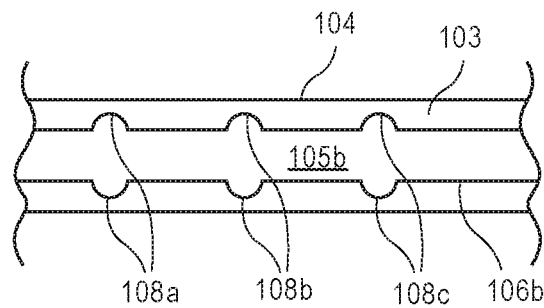
FIG. 1C is a schematic, partial cross-sectional view diagram of a cast or molded component taken along line B-B' shown in FIG. 1B, according to an implementation.

FIG. 1C is a schematic, partial cross-sectional view diagram of a cast or molded component 102 taken along line B-B' shown in FIG. 1B, according to an implementation.

As shown in FIG. 1C, the component 102 may also be formed with one or more surface features 108 formed on one or more internal skins 106 of the component 102. The surface features 108 may be formed by corresponding surface features included in surfaces of corresponding mandrels. The various surface features 108 may include corrugations, ribs, striations, protrusions, bumps, indentations, dimples, or other surface features, or combinations thereof.

FIG. 1C shows three ribs 108*a*, 108*b*, 108*c* formed on the internal skin 106*b* of the negative space spar 105*b*. The three ribs 108*a*, 108*b*, 108*c* are shown as indentations that extend a greater depth into the foam material composition 103 than a remainder of the internal skin 106*b*. In other example embodiments, the ribs 108 may be formed as protrusions that extend a lesser depth into the foam material composition 103 than a remainder of the internal skin 106*b*. In still other example embodiments, the internal skin 106*b* may include any other type, number, or arrangement of surface features. Although FIG. 1C shows surface features only on internal skin 106*b* within negative space spar 105*b*, surface features of any type, number, or arrangement may also be formed on internal skins 106 of any other negative space spars 105.

Figure 1D:
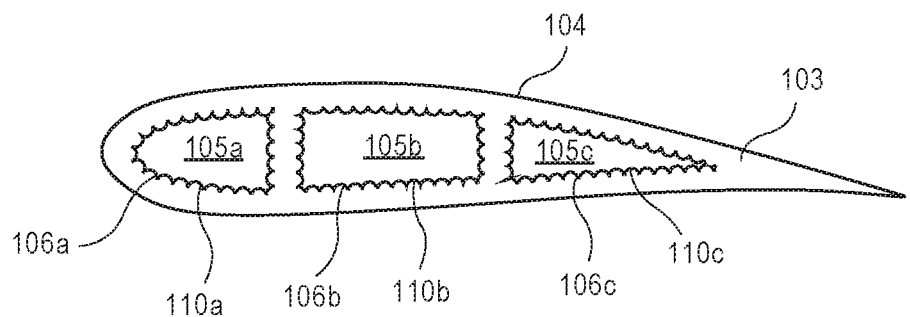
FIG. 1D is another schematic, cross-sectional view diagram of a cast or molded component taken along line A-A' shown in FIG. 1A, according to an implementation.

FIG. 1D is another schematic, cross-sectional view diagram of a cast or molded component 102 taken along line A-A' shown in FIG. 1A, according to an implementation.

As shown in FIG. 1D, the component 102 may also be formed with one or more other surface features 110 formed on one or more internal skins 106 of the component 102. The surface features 110 may be formed by corresponding surface features included in surfaces of corresponding mandrels. The various surface features 110 may include corrugations, ribs, striations, protrusions, bumps, indentations, dimples, or other surface features, or combinations thereof.

FIG. 1D shows three sets of corrugations 110*a*, 110*b*, 110*c* formed on the internal skins 106*a*, 106*b*, 106*c* of the negative space spars 105*a*, 105*b*, 105*c*. The three sets of corrugations 110*a*, 110*b*, 110*c* are shown as peaks and valleys, or ridges and grooves, that extend along a long axis of the component 102, e.g., along a length of a wing. In other example embodiments, the internal skins 106*a*, 106*b*, 106*c* may include any other type, number, or arrangement of surface features. Although FIG. 1D shows the same or similar surface features on internal skins 106*a*, 106*b*, 106*c* within negative space spars 105*a*, 105*b*, 105*c*, different or dissimilar surface features of any type, number, or arrangement may also be formed on internal skins 106 of the negative space spars 105.

The various surface features may be formed by corresponding surface features included in surfaces of corresponding mandrels. In some example embodiments, the mandrels may be inflatable, adjustable, or expanding mandrels, or may include inflatable, adjustable, or expanding portions therein, in order to form the surface features on the internal skins 106 of the negative space spars 105. For example, inflatable mandrels or inflatable portions of mandrels may expand in size upon injection of fluid, e.g., gas or liquid, into the mandrel and may reduce in size upon removal of the fluid. Adjustable mandrels or adjustable portions of mandrels may include movable or actuatable portions to selectively modify a shape or surface of the mandrel. Expanding mandrels or expanding portions of mandrels may expand or reduce in size upon a change in condition, e.g., change in temperature, such as the thermally expanding mandrels described herein.

Although FIGS. 1C and 1D show various surface features formed on one or more internal skins 106 of the component 102, various surface features may also be formed on an external skin 104 of the component 102 by corresponding surface features included in surfaces of a molding tool.

The various surface features may be formed by corresponding surface features included in surfaces of corresponding molding tools. In some example embodiments, the molding tools may be inflatable, adjustable, or expanding molding tools, or may include inflatable, adjustable, or expanding portions therein, in order to form the surface features on the external skins 104 of the components 102. For example, inflatable molding tools or inflatable portions of molding tools may expand in size upon injection of fluid, e.g., gas or liquid, into the molding tools and may reduce in size upon removal of the fluid. Adjustable molding tools or adjustable portions of molding tools may include movable or actuatable portions to selectively modify a shape or surface of the molding tools. Expanding molding tools or expanding portions of molding tools may expand or reduce in size upon a change in condition, e.g., change in temperature.

In example embodiments, the various surface features included on the internal skins 106 of the negative space spars 105 and/or the external skin 104 of the component 102 may further increase surface area of contact between the one or more skins and other portions of the foam material composition, thereby increasing interlaminar shear strength between the one or more skins and other portions of the foam material composition to further contribute to the increased structural strength of the component 102. Moreover, with the inclusion of surface features on one or more skins of the component 102 that increase structural strength, wall thicknesses between two or more skins of the component may be further reduced, thereby further reducing material usage and weight of the component 102 while increasing structural strength.

Figure 1E:
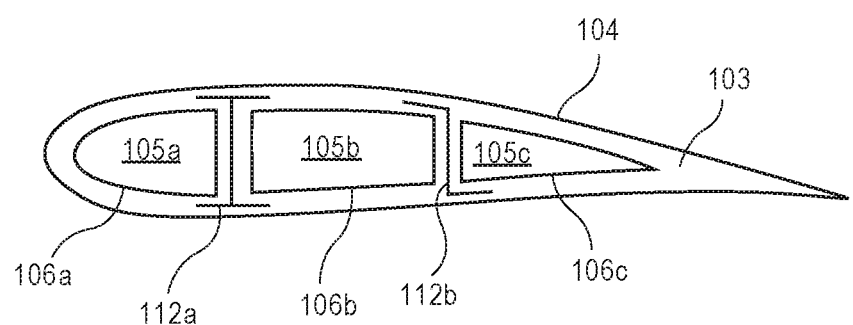
FIG. 1E is yet another schematic, cross-sectional view diagram of a cast or molded component taken along line A-A' shown in FIG. 1A, according to an implementation.

FIG. 1E is yet another schematic, cross-sectional view diagram of a cast or molded component 102 taken along line A-A' shown in FIG. 1A, according to an implementation.

As shown in FIG. 1E, the component 102 may also be formed with one or more support materials 112 included at least partially within or attached or adhered to the foam material composition 103. For example, the support materials 112 may include a beam, rod, spar, or other structural support. In example embodiments, the support materials 112 may be inserted into a molding tool and be surrounded by and molded into the foam material composition 103. In other example embodiments, the support materials 112 may be inserted into, attached to, or adhered to a cast or molded component 102 after the foam material composition has expanded and cured to form the component 102. The support materials 112 may be formed of various types of materials, such as metals, plastics, woods, ceramics, polymers, or any other materials, or combinations thereof. In addition, the support materials 112 may have any desired shape.

FIG. 1E shows two support materials 112*a*, 112*b* included within the foam material composition 103. For example, the support material 112a may have an I-beam shape, and the support material 112b may have a Z-spar shape. In other example embodiments, the component 102 may include any other type, shape, number, or arrangement of support materials 112.

In example embodiments, the various support materials included at least partially within or attached or adhered to the foam material composition may further contribute to the increased structural strength of the component 102. Moreover, with the inclusion of support materials as part of the component 102 that increase structural strength, wall thicknesses of one or more portions of the component may be further reduced, thereby further reducing material usage and weight of the component 102 while increasing structural strength.

While FIGS. 1A-1E describe various aspects of cast or molded components 102 individually, the various features described with respect to FIGS. 1A-1E may be combined in various combinations. For example, external skins 104 of components 102 and/or internal skins 106 of negative space spars 105 may include combinations of various surface features, such as both ribs 108 and corrugations 110 as described with respect to FIGS. 1C and 1D. In addition, a first portion of a component 102 may include skins 104, 106 with various surface features, and a second portion of a component 102 may include support materials 112. Various other combinations of the various features described with respect to FIGS. 1A-1E may also be included in cast or molded components 102.

Figure 2:
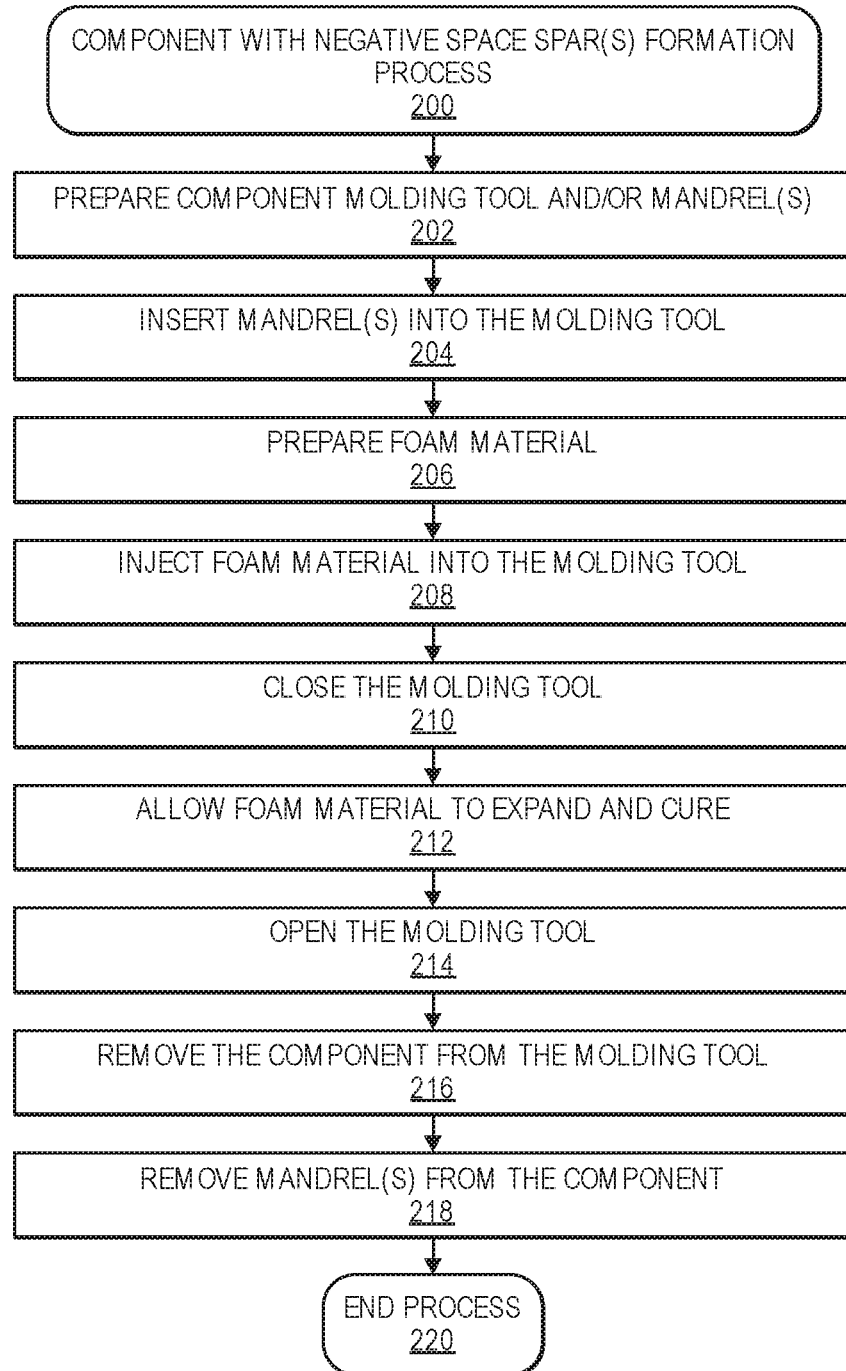
FIG. 2 is a flow diagram illustrating an example component with negative space spar(s) formation process, according to an implementation.

FIG. 2 is a flow diagram illustrating an example component with negative space spar(s) formation process 200, according to an implementation.

The process 200 may begin by preparing a molding tool and/or one or more mandrels, as at 202. For example, one or more release agents may be applied to the molding tool and/or the one or more mandrels such that a cast or molded component may be removed from the molding tool and/or the one or more mandrels may be removed from the component upon completion of the process 200. Further, the molding tool and/or the one or more mandrels may be designed with various draft angles to facilitate removal of a cast or molded component from the molding tool and/or removal of the one or more mandrels from the component. Moreover, the molding tool and/or the one or more mandrels may include various surface features as described herein, in order to create corresponding surface features on exterior and/or interior surfaces of the component, such as corrugations, ribs, striations, protrusions, bumps, indentations, dimples, or other surface features, or combinations thereof.

The molding tool may be a single-part, two-part, or multi-part molding tool, and the molding tool may be formed from various materials, such as aluminum, carbon, steel, Inconel, other metals, ceramics, polymers, composites, or combinations thereof. In addition, the one or more mandrels may be solid or rigid mandrels, or inflatable, adjustable, or expanding mandrels, and the one or more mandrels may be formed from various materials, such as aluminum, carbon, steel, Inconel, other metals, ceramics, polymers, composites, plastics, silicone, rubber, or combinations thereof.

The process 200 may continue by inserting the one or more mandrels into the molding tool, as at 204. For example, the one or more mandrels may be placed in position within or relative to the molding tool, in order to form the component with desired negative space spars at particular positions and/or with a particular arrangement.

The process 200 may then proceed by preparing the foam material composition, as at 206. For example, the foam material composition may be a self-skinning foam material composition, as described herein. In addition, the foam material composition may be a two-part or multi-part composition of different materials that may begin to expand and cure upon mixing of the different materials. In some embodiments, the foam material composition may expand and cure within seconds, e.g., 10-59 seconds, or minutes, e.g., 1-30 minutes. In other embodiments, the foam material composition may expand and cure over a shorter or longer duration of time. In example embodiments, the foam material composition may be cooled, e.g., down to about 15 degrees Fahrenheit, in order to slow the expansion and curing of the foam material composition and thereby increase the duration of time during which the foam material composition may be prepared and handled. Further, the foam material composition may be modified with the addition of water or other additives to affect the expansion ratio.

The process 200 may then continue by injecting the foam material composition into the molding tool, as at 208. In addition, the foam material composition may by injected around the one or more mandrels that are inserted into or placed relative to the molding tool. For example, the foam material composition may be metered into the molding tool such that a precisely measured or determined amount of foam material composition is injected into the molding tool. The amount of foam material composition to be injected or metered may be determined based at least in part on a volume of the cast or molded component and a desired overvolume pressure to be generated during expansion and curing of the foam material composition within the molding tool. As described herein, in some example embodiments, self-skinning foams may form skins on their exterior surface facing the molding tool, and/or on their interior surfaces facing one or more mandrels, upon generation of at least approximately 10% overvolume pressure within the molding tool. In alternative embodiments, different percentages of overvolume pressure may be generated within the molding tool, e.g., approximately 5%, approximately 8%, approximately 12%, or approximately 15%, or within a range of approximately 5% to approximately 20% overvolume pressure. In further example embodiments, prior to injecting the foam material composition into the molding tool, one or more support materials as described herein may be inserted or placed into the molding tool.

The process 200 may then proceed by closing the molding tool, as at 210. The closed molding tool may substantially seal the foam material composition within the molding tool and/or around the one or more mandrels. In some example embodiments, prior to closing the molding tool, one or more support materials as described herein may be inserted or placed into the molding tool. Then, the process 200 may continue by allowing the foam material composition to expand and cure, as at 212. Within the closed molding tool, the foam material composition may generate a desired overvolume pressure, such that one or more skins may be formed on surfaces of the component.

After completion of the expansion and curing of the foam material composition, the process 200 may continue by opening the molding tool, as at 214. Then, the process 200 may proceed by removing the component from the molding tool, as at 216, and by removing the one or more mandrels from the component, as at 218. For example, the release agents and/or draft angles of the molding tool may facilitate removal of the component from the molding tool. Likewise, the release agents and/or draft angles of the one or more mandrels may facilitate removal of the one or more mandrels from the component. In some example embodiments, after removing the component from the molding tool and/or after removing the one or more mandrels from the component, one or more support materials as described herein may be inserted, attached, or adhered to the component. The process 200 may then end, as at 220.

The cast or molded component may include an external skin on an exterior surface of the component, and may also include one or more internal skins on interior surfaces of one or more negative space spars formed by the one or more mandrels. As described herein, the one or more negative space spars may reduce material usage and weight of the component, and interlaminar shear strength between the one or more skins and other portions of the foam material composition may contribute to the increased structural strength of the component.

All or portions of the process 200 described herein may be performed by automated or semi-automated machinery that is controlled and/or programmed to perform one or more steps of the process 200. For example, automated or semi-automated machinery or robotics may prepare the molding tool and/or the one or more mandrels for molding components, and/or may insert the one or more mandrels into the molding tool. In addition, automated or semi-automated machinery or robotics may prepare the foam material composition, and/or may inject or meter the foam material composition into the molding tool. Further, automated or semi-automated machinery or robotics may close the molding tool to allow the foam material composition to expand and cure, and/or may open the molding tool upon completion. Moreover, automated or semi-automated machinery or robotics may remove the component from the molding tool, and/or may remove the one or more mandrels from the component.

Figure 3A:
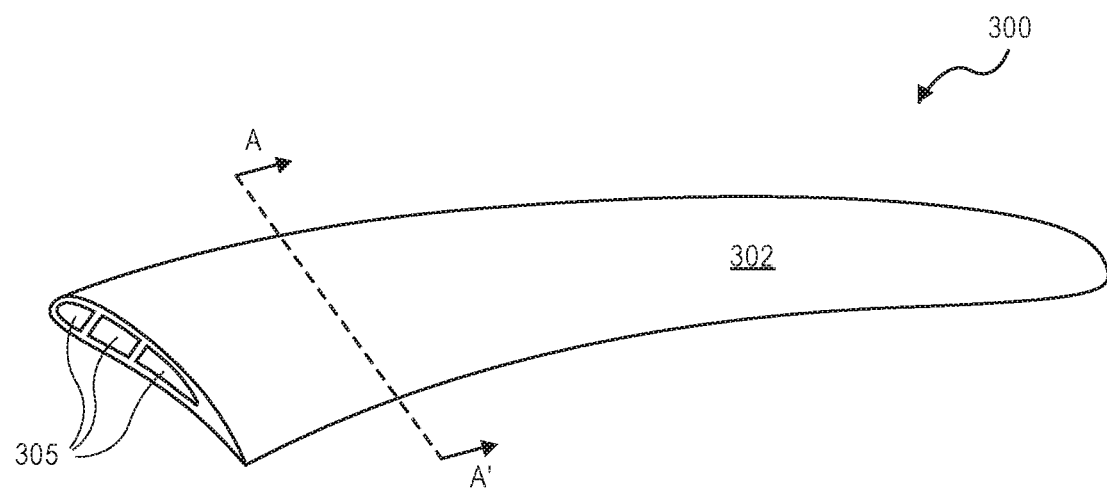
FIG. 3A is a schematic, perspective view diagram of a cast or molded component, according to an implementation.

FIG. 3A is a schematic, perspective view diagram of a cast or molded component 302, according to an implementation 300.

Figure 3B:
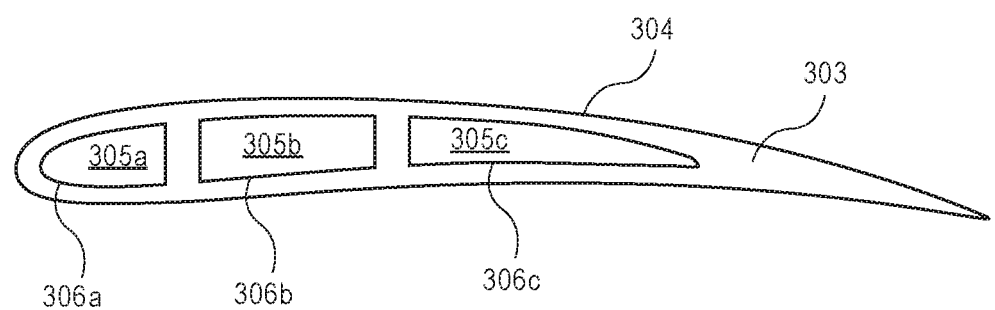
FIG. 3B is a schematic, cross-sectional view diagram of a cast or molded component taken along line A-A' shown in FIG. 3A, according to an implementation.

In example embodiments, the cast or molded component 302 may be a wing, beam, or other component of an aerial vehicle. In other example embodiments, the cast or molded component 302 may be any other component, e.g., a beam, spar, rod, tube, or other component, of any other type of vehicle, machine, structure, device, or system. Although FIGS. 3A and 3B depict an example wing as the cast or molded component 302, the systems and methods described herein are not limited to wings or other components of aerial vehicles.

The cast or molded component 302 may be formed from a foam material composition, e.g., urethane or polyurethane foams, and one or more resin coatings, e.g., urethane resins, on surfaces of the component. In example embodiments, the foam material composition may be an expanding foam material that expands and cures substantially at room temperature. For example, the foam material composition may expand and cure without the application of heat to the foam material composition. In alternative embodiments, the foam material composition may be an expanding foam material that expands and cures upon application of heat. For example, the foam material composition may expand and cure at a faster rate upon application of heat as compared to the rate of expansion and curing substantially at room temperature.

Example foam material compositions may include four-pound foams, two-pound foams, or other types of foams. For example, a four-pound foam indicates an expansion ratio of approximately four pounds per cubic foot, a two-pound foam indicates an expansion ratio of approximately two pounds per cubic foot, etc. In some example embodiments, the foam material composition may be modified with the addition of water or other additives to affect the expansion ratio. For example, the addition of approximately five drops of water to approximately 160 grams of two-pound foam may increase the expansion ratio by approximately 30%.

The one or more resin coatings on surfaces of the component 302 may be formed from urethane resins. In some example embodiments, the urethane resins may be modified with microspheres or other additives to reduce the weight of the urethane resins. For example, the microspheres may be hollow glass, plastic, or polymer microspheres or microbeads. In further example embodiments, the urethane resins may be modified with pigments or other coloring agents in order to form a component having a desired color. In example embodiments, the resin coatings may cure substantially at room temperature. For example, the resin coatings may cure without the application of heat to the resin coatings. In alternative embodiments, the resin coatings may be cured with the application of heat. For example, the resin coatings may cure at a faster rate upon application of heat as compared to the rate of curing substantially at room temperature.

The one or more resin coatings may be applied to surfaces of a molding tool and/or one or more mandrels, and the one or more resin coatings may be cured, e.g., upon application of heat. For example, the molding tool and/or the one or more mandrels may be heated, e.g., placed in an oven, in order to cure the resin coatings. The curing of the resin coatings may at least partially overlap with the expansion and curing of the foam material composition. As a result, the resin coatings may form an external skin on an exterior surface of the component 302, and/or one or more internal skins on interior surfaces of the component 302. As described herein, one or more negative space spars formed by the one or more mandrels may reduce material usage and weight of the component 302, and interlaminar shear strength between the one or more skins formed by resin coatings and portions of the foam material composition may contribute to the increased structural strength of the component 302.

As shown in FIG. 3A, the cast or molded component 302 may also include one or more negative space spars 305. The negative space spars 305 may be formed by the insertion of one or more mandrels into a molding tool that forms the cast or molded component 302. Each of the negative space spars 305 may have any desired shape based at least in part on a shape of a corresponding mandrel. Although FIG. 3A shows three negative space spars 305 within the cast or molded component 302, any other number or arrangement of negative space spars 305 may be included in the component 302. For example, the component 302 may include only a single negative space spar 305 in any position, or the component 302 may include multiple negative space spars in any arrangement.

In example embodiments, the negative space spars 305 may reduce material usage and weight of the component 302. Further, by forming the component 302 using resin coatings around a foam material composition, one or more skins may be formed by the resin coatings on an exterior surface and/or one or more interior surfaces, and the one or more skins may increase structural strength of the component 302. For example, interlaminar shear strength between the one or more skins formed by the resin coatings and portions of the foam material composition may contribute to the increased structural strength of the component 302.

FIG. 3B is a schematic, cross-sectional view diagram of a cast or molded component 302 taken along line A-A' shown in FIG. 3A, according to an implementation.

FIG. 3B shows a component 302 formed of a foam material composition 303, e.g., an expanding foam material composition. An external skin 304 may be formed on an exterior surface of the component 302 by a resin coating applied to surfaces of a molding tool and cured, e.g., by application of heat, at least partially during expansion and curing of the foam material composition within the molding tool.

In addition, as shown in FIG. 3B, the component 302 may include three negative space spars 305a, 305b, 305c formed by the insertion of corresponding mandrels into the molding tool. Three internal skins 306a, 306b, 306c may be formed on interior surfaces of the three negative space spars 305a, 305b, 305c of the component 302 by resin coatings applied to surfaces of the corresponding mandrels and cured, e.g., by application of heat, at least partially during expansion and curing of the foam material composition within the molding tool.

In example embodiments, the negative space spars 305a, 305b, 305c may reduce material usage and weight of the component 302. Further, by forming the component 302 using an expanding foam material composition and resin coatings on one or more surfaces, an external skin 304 may be formed on an exterior surface by a resin coating and one or more internal skins 306a, 306b, 306c may be formed on one or more interior surfaces by resin coatings, and the one or more skins 304, 306a, 306b, 306c may increase structural strength of the component 302. For example, interlaminar shear strength between the one or more skins formed by the resin coatings and portions of the foam material composition may contribute to the increased structural strength of the component 302.

As described herein with respect to FIGS. 1C-1E, the component 302 shown in FIGS. 3A and 3B may also be formed with one or more surface features formed on one or more internal skins 306 of the component 302. The surface features may be formed by corresponding surface features included in surfaces of corresponding mandrels. The various surface features may include corrugations, ribs, striations, protrusions, bumps, indentations, dimples, or other surface features, or combinations thereof. In example embodiments, surface features of any type, number, or arrangement may be formed on internal skins 306 of any negative space spars 305.

The various surface features may be formed by corresponding surface features included in surfaces of corresponding mandrels. In some example embodiments, the mandrels may be inflatable, adjustable, or expanding mandrels, or may include inflatable, adjustable, or expanding portions therein, in order to form the surface features on the internal skins 306 of the negative space spars 305. For example, inflatable mandrels or inflatable portions of mandrels may expand in size upon injection of fluid, e.g., gas or liquid, into the mandrel and may reduce in size upon removal of the fluid. Adjustable mandrels or adjustable portions of mandrels may include movable or actuatable portions to selectively modify a shape or surface of the mandrel. Expanding mandrels or expanding portions of mandrels may expand or reduce in size upon a change in condition, e.g., change in temperature, such as the thermally expanding mandrels described herein.

In further example embodiments, as described herein with respect to FIGS. 1C-1E, the component 302 shown in FIGS. 3A and 3B may also be formed with various surface features formed on an external skin 304 of the component 302. The surface features may be formed by corresponding surface features included in surfaces of a molding tool. The various surface features may include corrugations, ribs, striations, protrusions, bumps, indentations, dimples, or other surface features, or combinations thereof. In example embodiments, surface features of any type, number, or arrangement may be formed on the external skin 304 of the component 302.

The various surface features may be formed by corresponding surface features included in surfaces of corresponding molding tools. In some example embodiments, the molding tools may be inflatable, adjustable, or expanding molding tools, or may include inflatable, adjustable, or expanding portions therein, in order to form the surface features on the external skins 304 of the components 302. For example, inflatable molding tools or inflatable portions of molding tools may expand in size upon injection of fluid, e.g., gas or liquid, into the molding tools and may reduce in size upon removal of the fluid. Adjustable molding tools or adjustable portions of molding tools may include movable or actuatable portions to selectively modify a shape or surface of the molding tools. Expanding molding tools or expanding portions of molding tools may expand or reduce in size upon a change in condition, e.g., change in temperature.

In example embodiments, the various surface features included on the internal skins 306 of the negative space spars 305 and/or the external skin 304 of the component 302 may further increase surface area of contact between the one or more skins formed by resin coatings and portions of the foam material composition, thereby increasing interlaminar shear strength between the one or more skins and portions of the foam material composition to further contribute to the increased structural strength of the component 302. Moreover, with the inclusion of surface features on one or more skins of the component 302 that increase structural strength, wall thicknesses between two or more skins of the component may be further reduced, thereby further reducing material usage and weight of the component 302 while increasing structural strength.

In still further example embodiments, as described herein with respect to FIGS. 1C-1E, the component 302 shown in FIGS. 3A and 3B may also be formed with one or more support materials included at least partially within or attached or adhered to the foam material composition 303. For example, the support materials may include a beam, rod, spar, or other structural support. In example embodiments, the support materials may be inserted into a molding tool and be surrounded by and molded into the foam material composition 303. In other example embodiments, the support materials may be inserted into, attached to, or adhered to a cast or molded component 302 after the foam material composition has expanded and cured to form the component 302. The support materials may be formed of various types of materials, such as metals, plastics, woods, ceramics, polymers, or any other materials, or combinations thereof. In addition, the support materials may have any desired shape. In example embodiments, the component 302 may include any type, shape, number, or arrangement of support materials.

In example embodiments, the various support materials included at least partially within or attached or adhered to the foam material composition may further contribute to the increased structural strength of the component 302. Moreover, with the inclusion of support materials as part of the component 302 that increase structural strength, wall thicknesses of one or more portions of the component may be further reduced, thereby further reducing material usage and weight of the component 302 while increasing structural strength.

While the description with respect to FIGS. 3A and 3B describes various aspects of cast or molded components 302 individually, the various features described herein may be combined in various combinations. For example, external skins 304 of components 302 and/or internal skins 306 of negative space spars 305 may include combinations of various surface features, such as both ribs and corrugations. In addition, a first portion of a component 302 may include skins 304, 306 with various surface features, and a second portion of a component 302 may include support materials. Various other combinations of the various features described herein may also be included in cast or molded components 302.

Figure 4:
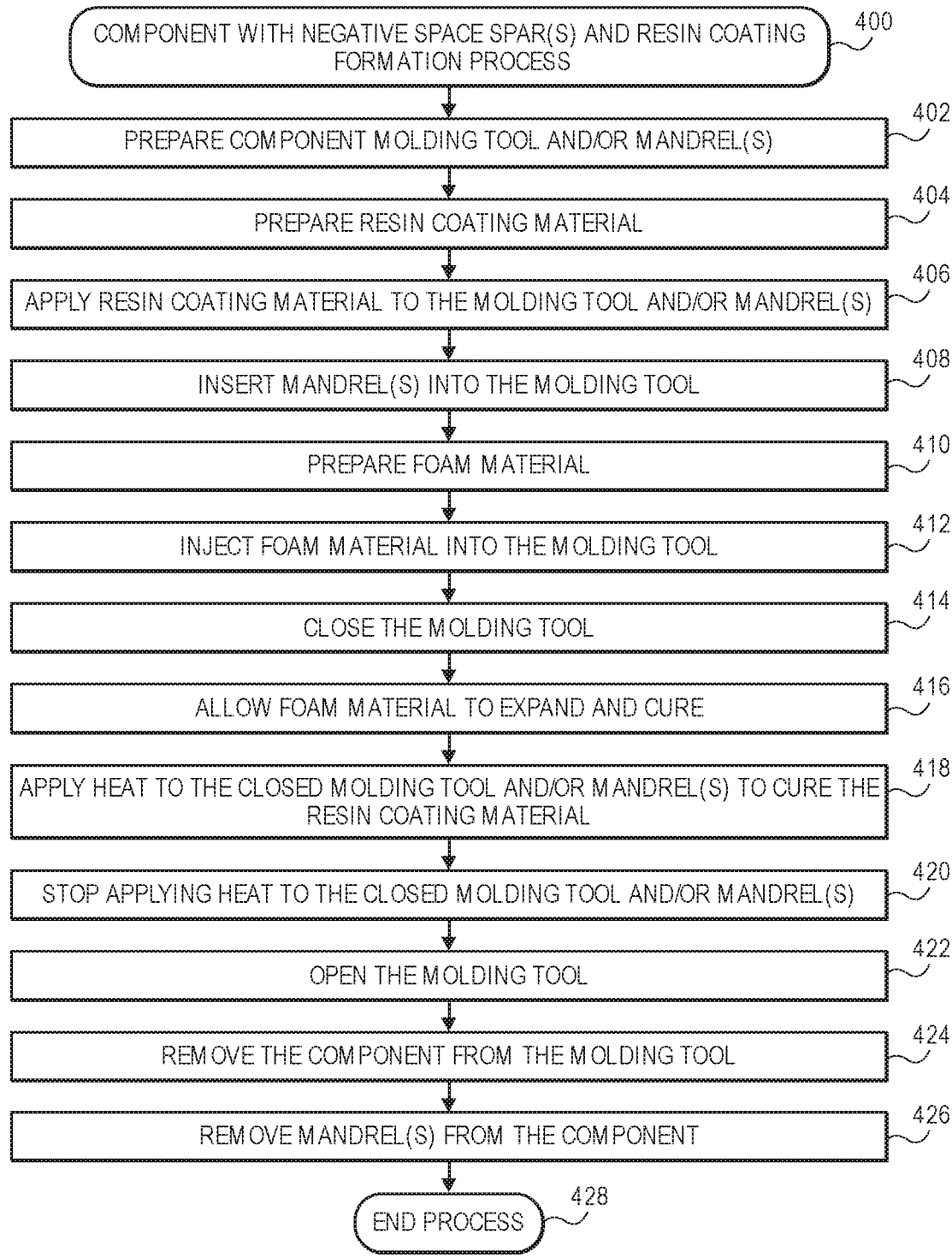
FIG. 4 is a flow diagram illustrating an example component with negative space spar(s) and resin coating formation process, according to an implementation.

FIG. 4 is a flow diagram illustrating an example component with negative space spar(s) and resin coating formation process 400, according to an implementation.

The process 400 may begin by preparing a molding tool and/or one or more mandrels, as at 402. For example, one or more release agents may be applied to the molding tool and/or the one or more mandrels such that a cast or molded component may be removed from the molding tool and/or the one or more mandrels may be removed from the component upon completion of the process 400. Further, the molding tool and/or the one or more mandrels may be designed with various draft angles to facilitate removal of a cast or molded component from the molding tool and/or removal of the one or more mandrels from the component. Moreover, the molding tool and/or the one or more mandrels may include various surface features as described herein, in order to create corresponding surface features on exterior and/or interior surfaces of the component, such as corrugations, ribs, striations, protrusions, bumps, indentations, dimples, or other surface features, or combinations thereof.

The molding tool may be a single-part, two-part, or multi-part molding tool, and the molding tool may be formed from various materials, such as aluminum, carbon, steel, Inconel, other metals, ceramics, polymers, composites, or combinations thereof. In addition, the one or more mandrels may be solid or rigid mandrels, or inflatable, adjustable, or expanding mandrels, and the one or more mandrels may be formed from various materials, such as aluminum, carbon, steel, Inconel, other metals, ceramics, polymers, composites, plastics, silicone, rubber, or combinations thereof.

The process 400 may continue by preparing a resin coating material, as at 404. For example, the resin coating material may be a urethane resin that cures upon application of heat and/or substantially at room temperature. In addition, the resin coating material may be modified with additives such as microspheres or microbeads to reduce the weight of the resin coating material. Further, the resin coating material may be modified with pigments or coloring agents to form a component with a desired color.

The process 400 may then proceed by applying the resin coating material to the molding tool and/or one or more mandrels, as at 406. For example, the resin coating material may be applied to surfaces of the molding tool and/or the one or more mandrels in a thin layer, e.g., having a thickness of approximately 15-20 thousandths of an inch. In other example embodiments, the resin coating material may be applied in layers having different thicknesses, as desired, that may affect the resultant weight and/or strength of the component.

The process 400 may continue by inserting the one or more mandrels into the molding tool, as at 408. For example, the one or more mandrels may be placed in position within or relative to the molding tool, in order to form the component with desired negative space spars at particular positions and/or with a particular arrangement.

The process 400 may then proceed by preparing the foam material composition, as at 410. For example, the foam material composition may be an expanding foam material composition, as described herein. In addition, the foam material composition may be a two-part or multi-part composition of different materials that may begin to expand and cure upon mixing of the different materials. In some embodiments, the foam material composition may expand and cure within seconds, e.g., 10-59 seconds, or minutes, e.g., 1-30 minutes. In other embodiments, the foam material composition may expand and cure over a shorter or longer duration of time. In example embodiments, the foam material composition may be cooled, e.g., down to about 15 degrees Fahrenheit, in order to slow the expansion and curing of the foam material composition and thereby increase the duration of time during which the foam material composition may be prepared and handled. Further, the foam material composition may be modified with the addition of water or other additives to affect the expansion ratio.

The process 400 may then continue by injecting the foam material composition into the molding tool, as at 412. In addition, the foam material composition may by injected around the one or more mandrels that are inserted into or placed relative to the molding tool. For example, the foam material composition may be metered into the molding tool such that a precisely measured or determined amount of foam material composition is injected into the molding tool. The amount of foam material composition to be injected or metered may be determined based at least in part on a volume of the cast or molded component and a desired overvolume pressure to be generated during expansion and curing of the foam material composition within the molding tool. In further example embodiments, prior to injecting the foam material composition into the molding tool, one or more support materials as described herein may be inserted or placed into the molding tool.

The process 400 may then proceed by closing the molding tool, as at 414. The closed molding tool may substantially seal the foam material composition within the molding tool and/or around the one or more mandrels. In some example embodiments, prior to closing the molding tool, one or more support materials as described herein may be inserted or placed into the molding tool. Then, the process 400 may continue by allowing the foam material composition to expand and cure, as at 416. Within the closed molding tool, the foam material composition may generate a desired overvolume pressure. In some example embodiments, the foam material composition may expand and generate at least approximately 10% overvolume pressure within the molding tool. In alternative embodiments, different percentages of overvolume pressure may be generated within the molding tool, e.g., approximately 5%, approximately 8%, approximately 12%, or approximately 15%, or within a range of approximately 5% to approximately 20% overvolume pressure.

The process 400 may then continue by applying heat to the closed molding tool and/or the one or more mandrels to cure the resin coating material, as at 418. For example, heat may be applied by placing the molding tool and/or the one or more mandrels in a curing oven. Alternatively, heat may be applied to the molding tool and/or one or more mandrels by other methods, such as by direct application of heat to one or more portions of the molding tool and/or one or more mandrels. Some example resin coating materials may have a cure time of approximately a few hours at approximately 150 degrees Fahrenheit. In other example embodiments, other combinations of curing temperatures and curing times may be used based at least in part on properties of the resin coating material. The curing of the resin coating material may at least partially overlap with the expansion and curing of the foam material composition, in order to increase the interlaminar shear strength between the resin coating material and the foam material composition. In alternative embodiments, the resin coating materials may cure substantially at room temperature, e.g., without the application of heat. For example, the resin coating materials may have a cure time of approximately a few hours or a few days substantially at room temperature.

After completion of the expansion and curing of the foam material composition and completion of the curing of the resin coating material, the process 400 may continue by stopping the application of heat to the closed molding tool and/or the one or more mandrels, as at 420, and by opening the molding tool, as at 422. Then, the process 400 may proceed by removing the component from the molding tool, as at 424, and by removing the one or more mandrels from the component, as at 426. For example, the release agents and/or draft angles of the molding tool may facilitate removal of the component from the molding tool. Likewise, the release agents and/or draft angles of the one or more mandrels may facilitate removal of the one or more mandrels from the component. In some example embodiments, after removing the component from the molding tool and/or after removing the one or more mandrels from the component, one or more support materials as described herein may be inserted, attached, or adhered to the component. The process 400 may then end, as at 428.

The cast or molded component may include an external skin formed by a resin coating on an exterior surface of the component, and may also include one or more internal skins formed by resin coatings on interior surfaces of one or more negative space spars formed by the one or more mandrels. As described herein, the one or more negative space spars may reduce material usage and weight of the component, and interlaminar shear strength between the one or more skins formed by resin coatings and portions of the foam material composition may contribute to the increased structural strength of the component.

All or portions of the process 400 described herein may be performed by automated or semi-automated machinery that is controlled and/or programmed to perform one or more steps of the process 400. For example, automated or semi-automated machinery or robotics may prepare the molding tool and/or the one or more mandrels for molding components, and/or may insert the one or more mandrels into the molding tool. Further, automated or semi-automated machinery or robotics may prepare the resin coating material, and/or may apply the resin coating material to the molding tool and/or the one or more mandrels. In addition, automated or semi-automated machinery or robotics may prepare the foam material composition, and/or may inject or meter the foam material composition into the molding tool. Further, automated or semi-automated machinery or robotics may close the molding tool to allow the foam material composition to expand and cure, may apply heat to the closed molding tool and/or the one or more mandrels to cure the resin coating material, and/or may open the molding tool upon completion. Moreover, automated or semi-automated machinery or robotics may remove the component from the molding tool, and/or may remove the one or more mandrels from the component.

Figure 5A:
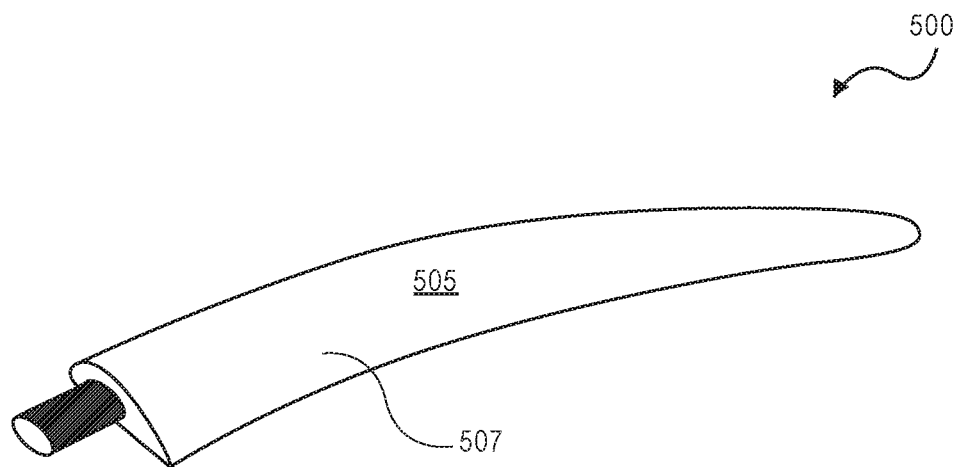
FIG. 5A is a schematic, perspective view diagram of a thermally expanding mandrel, according to an implementation.

FIG. 5A is a schematic, perspective view diagram of a thermally expanding mandrel 505, according to an implementation 500.

As shown in FIG. 5A, the thermally expanding mandrel 505 may be formed in any desired shape, e.g., a wing, beam, or other component of an aerial vehicle, or any other beam, spar, rod, tube, or other component, of any other type of vehicle, machine, structure, device, or system.

The thermally expanding mandrel 505 may be formed of a material composition 507 that facilitates expansion of the mandrel 505 upon application of heat. For example, the material composition 507 of the mandrel 505 may include thermally expanding particles and binder material. In example embodiments, the thermally expanding particles may include micronized rubber particles, e.g., +/−80 mesh micron rubber dust. In alternative embodiments, the mandrel 505 may be formed from micronized rubber powder, silicone rubber microspheres, silicone rubber powder, or other thermally expanding particles. In still further embodiments, the mandrel 505 may be formed from combinations of different types of thermally expanding particles. Some or all of the thermally expanding particles may be recycled, recyclable, and/or reusable materials, such as micronized rubber particles formed from crushed and ground rubber tires.

In example embodiments, the binder material may include gypsum plaster. In alternative embodiments, the mandrel 505 may be formed from other types of binder material, such as other water-soluble binder materials. In still further embodiments, the mandrel 505 may be formed from combinations of different types of binder materials. Some or all of the binder materials may be recycled, recyclable, and/or reusable materials, such as gypsum plaster.

The thermally expanding particles may have a relatively high coefficient of thermal expansion (CTE). For example, the thermally expanding particles may have a CTE that is higher than a CTE of materials of a molding tool at least partially inside of which the mandrel 505 is to be used and/or placed. As described herein, the molding tool may be formed from various materials, such as aluminum, carbon, steel, Inconel, other metals, ceramics, polymers, composites, or combinations thereof. The thermally expanding particles of the mandrel 505 and materials of the molding tool may be selected such that the CTE of the thermally expanding particles of the mandrel 505 is higher than the CTE of the materials of the molding tool. In this manner, the mandrel 505 may, upon application of heat, expand at a faster rate than the molding tool, such that the mandrel 505 may apply pressure to component materials applied thereto against surfaces of the molding tool. In some example embodiments, expansion of the thermally expanding particles of the mandrel 505 may generate at least approximately 10% overvolume pressure within the molding tool. In alternative embodiments, different percentages of overvolume pressure may be generated within the molding tool, e.g., approximately 5%, approximately 8%, approximately 12%, or approximately 15%, or within a range of approximately 5% to approximately 20% overvolume pressure.

The thermally expanding mandrel 505 may be formed using various methods and processes. For example, the mandrel 505 may be formed using molding processes by injecting or metering the material composition 507 into a mold of any desired shape and curing or otherwise hardening the material composition 507. In other example embodiments, the mandrel 505 may be formed using 3-D printing processes by printing, applying, or building up the material composition 507 into any desired shape. In further example embodiments, the mandrel 505 may be formed using machining processes by forming a blank of material from the material composition 507 and cutting, turning, drilling, grinding, polishing, or otherwise machining the material composition 507 into any desired shape. Moreover, the mandrel 505 may be formed using any of these processes, other processes, or combinations of different processes.

In example embodiments, the cast or molded components described herein, such as a wing, beam, or other component of an aerial vehicle, may be at least partially formed using a thermally expanding mandrel 505 to form one or more negative space spars. In other example embodiments, the cast or molded components may be any other component, e.g., a beam, spar, rod, tube, or other component, of any other type of vehicle, machine, structure, device, or system. Although FIGS. 5A-5D depict an example wing as the cast or molded component, the systems and methods described herein are not limited to wings or other components of aerial vehicles.

The cast or molded component that may be at least partially formed using a thermally expanding mandrel 505 may be formed from a foam material composition, e.g., urethane or polyurethane foams, expanding foam material compositions, self-skinning foam material compositions, and/or one or more resin coatings, e.g., urethane resins, on surfaces of the component as described herein. In example embodiments, the foam material composition may be an expanding foam material that expands and cures substantially at room temperature. For example, the foam material composition may expand and cure without the application of heat to the foam material composition.

In further example embodiments, the foam material composition may be a self-skinning foam material composition. For example, upon expansion of the foam material composition that results in a pressure increase at interfaces between the foam material composition and one or more surfaces of a molding tool and/or between the foam material composition and one or more surfaces of one or more mandrels inserted into the molding tool, an external skin may be formed on an exterior surface of the component and/or one or more internal skins may be formed on one or more interior surfaces of the component.

Example foam material compositions may include four-pound foams, two-pound foams, or other types of foams. For example, a four-pound foam indicates an expansion ratio of approximately four pounds per cubic foot, a two-pound foam indicates an expansion ratio of approximately two pounds per cubic foot, etc. In some example embodiments, the foam material composition may be modified with the addition of water or other additives to affect the expansion ratio. For example, the addition of approximately five drops of water to approximately 160 grams of two-pound foam may increase the expansion ratio by approximately 30%.

In some example embodiments, self-skinning foams may form skins on their exterior surface facing a molding tool, or interior surfaces facing mandrels, upon generation of at least approximately 10% overvolume pressure within a molding tool. In alternative embodiments, different percentages of overvolume pressure may be generated within the molding tool, e.g., approximately 5%, approximately 8%, approximately 12%, or approximately 15%, or within a range of approximately 5% to approximately 20% overvolume pressure. As described herein, one or more negative space spars formed by the one or more mandrels may reduce material usage and weight of the component, and interlaminar shear strength between the one or more skins and portions of the foam material composition may contribute to the increased structural strength of the component.

The one or more resin coatings on surfaces of the component that may be at least partially formed using a thermally expanding mandrel 505 may be formed from urethane resins. In some example embodiments, the urethane resins may be modified with microspheres or other additives to reduce the weight of the urethane resins. For example, the microspheres may be hollow glass, plastic, or polymer microspheres or microbeads. In further example embodiments, the urethane resins may be modified with pigments or other coloring agents in order to form a component having a desired color. In example embodiments, the resin coatings may cure substantially at room temperature. For example, the resin coatings may cure without the application of heat to the resin coatings. In alternative embodiments, the resin coatings may be cured with the application of heat. For example, the resin coatings may cure at a faster rate upon application of heat as compared to the rate of curing substantially at room temperature.

The one or more resin coatings may be applied to surfaces of a molding tool and/or one or more mandrels, and the one or more resin coatings may be cured, e.g., upon application of heat. For example, the molding tool and/or the one or more mandrels may be heated, e.g., placed in an oven, in order to cure the resin coatings. The curing of the resin coatings may at least partially overlap with the expansion and curing of the foam material composition. As a result, the resin coatings may form an external skin on an exterior surface of the component, and/or one or more internal skins on interior surfaces of the component. As described herein, one or more negative space spars formed by the one or more mandrels may reduce material usage and weight of the component, and interlaminar shear strength between the one or more skins formed by resin coatings and portions of the foam material composition may contribute to the increased structural strength of the component.

In further example embodiments, the molded component that may be at least partially formed using a thermally expanding mandrel 505 may be formed from component materials that are applied to, laid onto, or wrapped around the thermally expanding mandrel 505. The component materials may include carbon fiber strips, carbon fiber tape, carbon fiber sheets, Kevlar, fiberglass, composites, other materials such as polymers, plastics, ceramics, or combinations thereof that are applied to, laid onto, or wrapped around the thermally expanding mandrel 505, and the component materials may be cured upon application of heat and pressure. For example, the molding tool and/or the one or more mandrels may be heated, e.g., placed in an oven, in order to expand and cure the component materials. The thermally expanding mandrel 505 may expand upon application of heat, thereby expanding and applying pressure to the component materials within the molding tool, and may cure the expanded and compressed component materials due to the application of heat and pressure.

In example embodiments including various combinations of foam material compositions, resin coatings, and/or component materials, the curing of the component materials and/or resin coatings may at least partially overlap with the expansion and curing of the foam material composition. As a result, the component materials and/or resin coatings may form an external skin on an exterior surface of the component, and/or one or more internal skins on interior surfaces of the component. As described herein, one or more negative space spars formed by the one or more mandrels may reduce material usage and weight of the component, and interlaminar shear strength between the one or more skins formed by component materials and/or resin coatings and portions of the foam material composition may contribute to the increased structural strength of the component.

Although FIG. 5A shows only a single thermally expanding mandrel 505 that may be used to form a component or a negative space spar within a component having any desired shape, any other number, combination, or arrangement of one or more mandrels 505 may be used to form any desired number, combination, or arrangement of components or negative space spars within one or more components. In example embodiments, the negative space spars may reduce material usage and weight of the component.

Figure 5B:
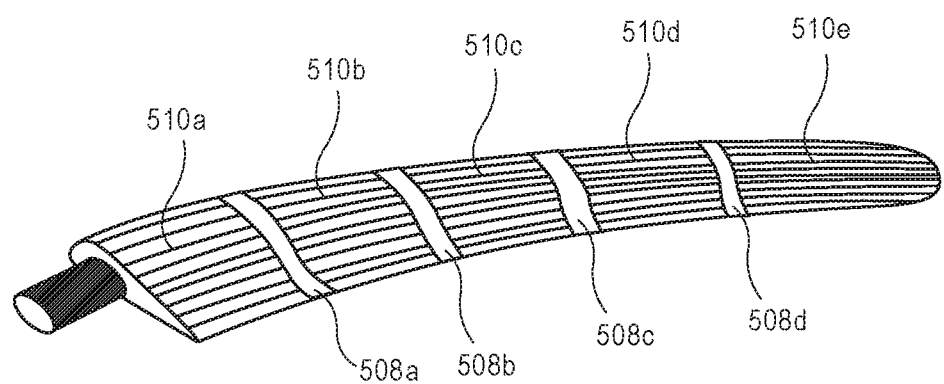
FIG. 5B is a schematic, perspective view diagram of another thermally expanding mandrel, according to an implementation.

FIG. 5B is a schematic, perspective view diagram of another thermally expanding mandrel 505, according to an implementation.

As shown in FIG. 5B, the thermally expanding mandrel 505 may also be formed with one more surface features 508, 510, as described herein with respect to FIGS. 1C-1E, formed on one or more portions of the exterior surface of the mandrel 505. The various surface features may include corrugations 510, ribs 508, striations, protrusions, bumps, indentations, dimples, or other surface features, or combinations thereof. While FIG. 5B shows a particular number, combination, and arrangement of ribs 508a, 508b, 508c, 508d and corrugations 510a, 510b, 510c, 510d, 510e, surface features of any type, number, or arrangement may be formed on one or more portions of the exterior surface of the mandrel 505, to thereby form corresponding surface features on interior surfaces of components and/or negative space spars of components.

The various surface features may be formed on one or more portions of the exterior surface of the mandrel 505 such that upon expansion of the thermally expanding mandrel 505, e.g., due to the application of heat, corresponding surface features of any desired size, shape, combination, and/or arrangement may be formed on interior surfaces of components and/or negative space spars of components.

In example embodiments, the various surface features included on one or more portions of the exterior surface of the mandrel 505 that form corresponding surface features on interior surfaces of components and/or negative space spars of components may further increase surface area of contact between one or more skins formed by self-skinning foam material compositions and/or resin coatings and portions of the foam material composition, thereby increasing interlaminar shear strength between the one or more skins and portions of the foam material composition to further contribute to the increased structural strength of the component. Moreover, with the inclusion of surface features on one or more skins of the component that increase structural strength, wall thicknesses between two or more skins of the component may be further reduced, thereby further reducing material usage and weight of the component while increasing structural strength.

In still further example embodiments, as described herein with respect to FIGS. 1C-1E, components that may be at least partially formed using a thermally expanding mandrel 505 may also include one or more support materials included at least partially within or attached or adhered to the foam material composition, the resin coatings, and/or the component materials. For example, the support materials may include a beam, rod, spar, or other structural support. In example embodiments, the support materials may be inserted into a molding tool and be surrounded by and molded into the foam material composition and/or the component materials. In other example embodiments, the support materials may be inserted into, attached to, or adhered to a cast or molded component after the foam material composition, the resin coatings, and/or the component materials have expanded and cured to form the component. The support materials may be formed of various types of materials, such as metals, plastics, woods, ceramics, polymers, or any other materials, or combinations thereof. In addition, the support materials may have any desired shape. In example embodiments, the component may include any type, shape, number, or arrangement of support materials.

In example embodiments, the various support materials included at least partially within or attached or adhered to the foam material composition, the resin coatings, and/or the component materials may further contribute to the increased structural strength of the component. Moreover, with the inclusion of support materials as part of the component that increase structural strength, wall thicknesses of one or more portions of the component may be further reduced, thereby further reducing material usage and weight of the component while increasing structural strength.

While the description with respect to FIGS. 5A and 5B describes various aspects of the thermally expanding mandrel 505 individually, the various features described herein may be combined in various combinations. For example, a first portion of the exterior surface of the mandrel 505 may include corrugations 510, and a second portion of the exterior surface of the mandrel 505 may include ribs 508. In addition, a first portion of the exterior surface of the mandrel 505 may include ribs 508, corrugations 510, and/or other surface features, and a second portion of the exterior surface of the mandrel 505 may not include any surface features. Various other combinations of the various features described herein may also be included in the thermally expanding mandrel 505.

Figure 5C:
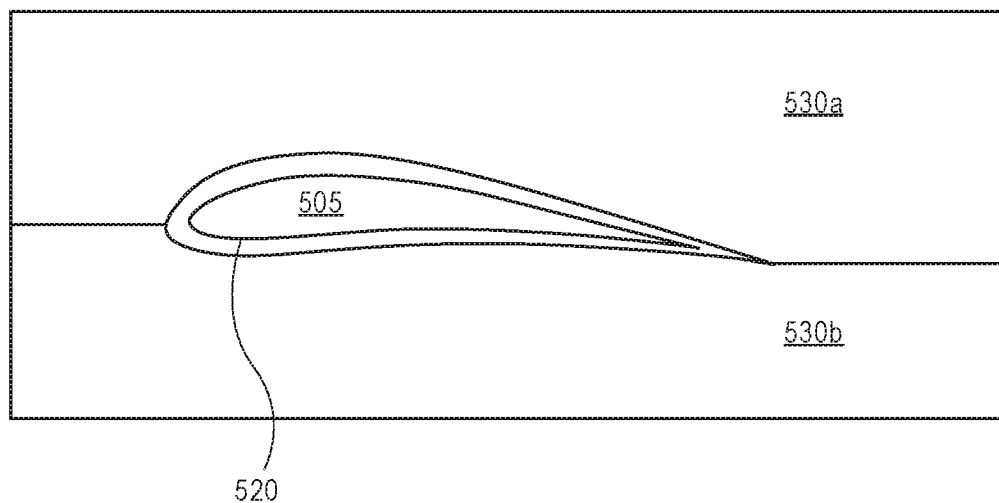
FIG. 5C is a schematic, cross-sectional view diagram of a thermally expanding mandrel within a molding tool at a first temperature, according to an implementation.

FIG. 5C is a schematic, cross-sectional view diagram of a thermally expanding mandrel 505 within a molding tool 530 at a first temperature, according to an implementation.

As shown in FIG. 5C, a thermally expanding mandrel 505 may be placed within a molding tool 530a, 530b. In example embodiments, the thermally expanding mandrel 505 may include component materials 520 applied or laid onto the exterior surface of the mandrel 505. As described herein, one or more portions of the exterior surface of the mandrel 505 may include various surface features. Further, one or more portions of the molding tool 530a, 530b may include various surface features, such as surface features that correspond to those included on the exterior surface of the mandrel 505 or other surface features, as desired.

The thermally expanding mandrel 505 may be formed from a thermally expanding material composition, e.g., micronized rubber particles and gypsum plaster. As shown in FIG. 5C, heat may not yet have been applied to the mandrel 505 and/or the molding tool 530a, 530b. For example, the mandrel 505 and/or the molding tool 530a, 530b may be at a first temperature, e.g., room temperature or some other ambient temperature, at which the mandrel 505 has not expanded or has only minimally expanded.

Figure 5D:
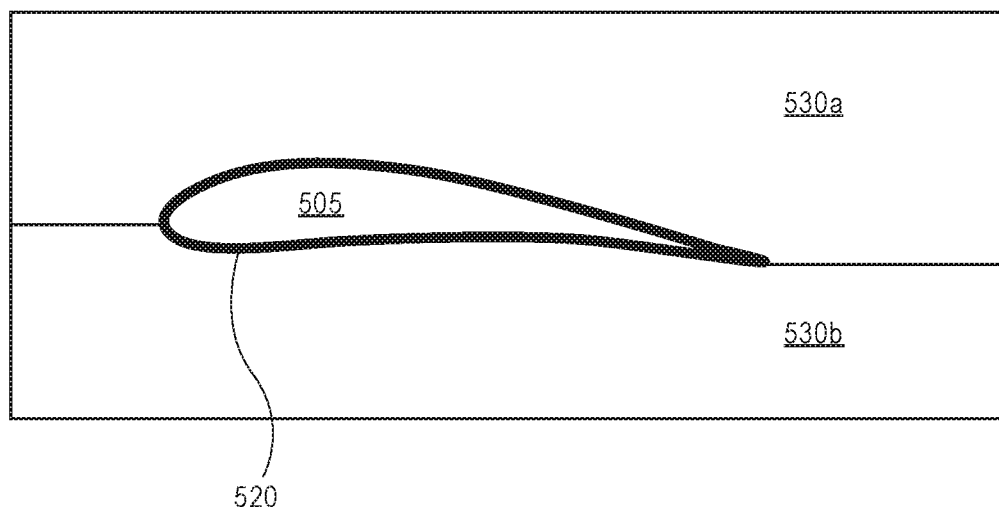
FIG. 5D is a schematic, cross-sectional view diagram of a thermally expanding mandrel within a molding tool at a second temperature, according to an implementation.

FIG. 5D is a schematic, cross-sectional view diagram of a thermally expanding mandrel 505 within a molding tool 530 at a second temperature, according to an implementation.

As shown in FIG. 5D, heat may have been applied to the mandrel 505 and/or the molding tool 530a, 530b. For example, the mandrel 505 and/or the molding tool 530a, 530b may be at a second temperature, e.g., 150 degrees Fahrenheit, 250 degrees Fahrenheit, 300 degrees Fahrenheit, or any other elevated temperature, at which the mandrel 505 has expanded.

Due at least partially to the difference in CTE between the thermally expanding material composition of the mandrel 505 and the materials of the molding tool 530a, 530b, the mandrel 505 may expand at a faster rate than the molding tool 530a, 530b. The expansion of the mandrel 505 may cause expansion of the component materials 520 applied or laid onto the mandrel 505. In addition, the expansion of the mandrel 505 may cause application of pressure to the component materials 520 between the exterior surface of the mandrel 505 and interior surfaces of the molding tool 530a, 530b. Further, the application of heat and pressure to the component materials 520, e.g., by the mandrel 505 and/or the molding tool 530a, 530b, may cause curing of the component materials 520 into a component having a desired shape. Further, various surface features included on the exterior surface of the mandrel 505 and/or on the interior surfaces of the molding tool 530a, 530b may cause the formation of corresponding surface features on interior and/or exterior surfaces, respectively, of the component materials 520.

As described further herein, after completion of the formation of the component using the thermally expanding mandrel 505, the temperatures of the mandrel 505, molding tool 530a, 530b, and/or the component may be reduced to the first temperature, or some other handling temperature. Then, the component may be removed from the molding tool 530a, 530b, and the thermally expanding material composition of the mandrel 505 may be washed out of the component, e.g., using hot, pressurized water.

In example embodiments in which the mandrel 505 is formed of micronized rubber particles and gypsum plaster, the expansion of the mandrel 505 due to application of heat may initiate at least partial breakage or fracturing of the micronized rubber particles from each other. In addition, the cooling of the mandrel 505 back to the first temperature, or some other handling temperature, may further cause breakage or fracturing of the micronized rubber particles from each other, at least partially due to their reduction in size as a result of cooling. Further, the application of hot, pressurized water may dissolve the gypsum plaster and cause additional, e.g., complete or nearly complete, breakage or fracturing of the micronized rubber particles from each other. In this manner, the micronized rubber particles and gypsum plaster may be washed out of the component using water. Moreover, the micronized rubber particles may be recycled, e.g., using a centrifuge or other filtering processes, and reused to form other thermally expanding mandrels. Furthermore, the gypsum plaster may also be recycled, e.g., using a plaster trap or other filtering processes, and also reused to form other thermally expanding mandrels.

Figure 6:
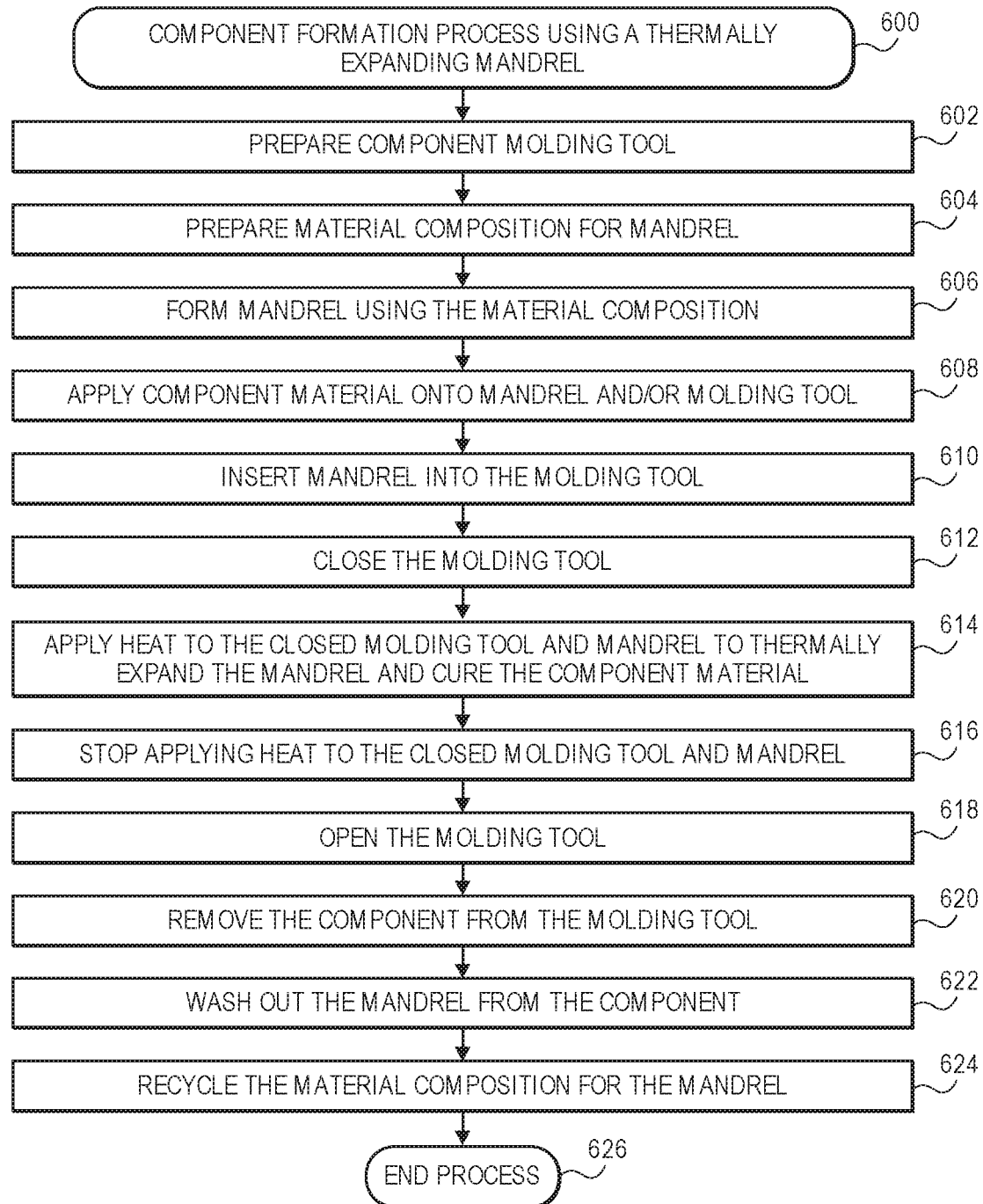
FIG. 6 is a flow diagram illustrating an example component formation process using a thermally expanding mandrel, according to an implementation.

FIG. 6 is a flow diagram illustrating an example component formation process using a thermally expanding mandrel 600, according to an implementation.

The process 600 may begin by preparing a molding tool, as at 602. For example, one or more release agents may be applied to the molding tool such that a cast or molded component may be removed from the molding tool upon completion of the process 600. Further, the molding tool may be designed with various draft angles to facilitate removal of a cast or molded component from the molding tool. Moreover, the molding tool may include various surface features as described herein, in order to create corresponding surface features on exterior surfaces of the component, such as corrugations, ribs, striations, protrusions, bumps, indentations, dimples, or other surface features, or combinations thereof.

The molding tool may be a single-part, two-part, or multi-part molding tool, and the molding tool may be formed from various materials, such as aluminum, carbon, steel, Inconel, other metals, ceramics, polymers, composites, or combinations thereof.

The process 600 may continue by preparing a material composition for a thermally expanding mandrel, as at 604. The material composition may be a thermally expanding material composition including thermally expanding particles and binder material. As described herein, the thermally expanding particles may include micronized rubber particles or powder, silicone rubber microspheres, particles, or powder, or other thermally expanding particles having a CTE that is higher than a CTE of materials of the molding tool. In addition, the binder material may be a water-soluble binder material, such as gypsum plaster. The relative proportions of thermally expanding particles and binder material may be determined based at least in part on desired CTE of the mandrel, processes to be used to form the mandrel, physical properties of the mandrel at various temperatures, physical properties of the molding tool at various temperatures, geometry of the component to be formed using the mandrel, and/or other factors related to the mandrel, mandrel formation, and/or component formation processes. The thermally expanding material composition may expand upon application of heat, contract upon removal of heat, break apart or fracture at least partially during or after use, and/or be removable or dissolvable using hot, pressurized water.

The process 600 may then proceed by forming the mandrel using the material composition, as at 606. The mandrel may be formed in any desired shape using various processes and methods. For example, the mandrel may be formed by molding or casting the material composition in a molding tool, 3-D printing, machining, other processes, or combinations thereof.

In further example embodiments, one or more release agents may be applied to the mandrel such that the material composition may be removed from the component upon completion of the process 600. Further, the mandrel may be designed with various draft angles to facilitate removal of one or more portions of the mandrel from the component. Moreover, the mandrel may include various surface features as described herein, in order to create corresponding surface features on interior surfaces of the component, such as corrugations, ribs, striations, protrusions, bumps, indentations, dimples, or other surface features, or combinations thereof.

The process 600 may then continue to apply component material onto the mandrel and/or the molding tool, as at 608. As described herein, the component material may include carbon fiber strips, tape, sheets, or other layers, other types of materials, or combinations thereof, that may be applied to, laid onto, or wrapped around the mandrel and expanded and cured upon application of heat and pressure within the molding tool. In example embodiments, the component material may be applied in one or more layers having various thicknesses, as desired, that may affect the resultant weight and/or strength of the component.

The process 600 may continue by inserting the mandrel into the molding tool, as at 610. For example, the thermally expanding mandrel may be placed in position within or relative to the molding tool, in order to form the component and/or a negative space spar within the component at a particular position and/or with a particular arrangement.

The process 600 may then proceed by closing the molding tool, as at 612. The closed molding tool may substantially seal the component material within the molding tool and/or around the mandrel. Then, the process 600 may continue by applying heat to the closed molding tool and/or the mandrel to thermally expand the mandrel and expand, compress, and cure the component material, as at 614. For example, heat may be applied by placing the molding tool and/or the mandrel in a curing oven. Alternatively, heat may be applied to the molding tool and/or the mandrel by other methods, such as by direct application of heat to one or more portions of the molding tool and/or the mandrel. Upon application of heat, the mandrel formed of a thermally expanding material composition having a higher CTE than a CTE of the materials of the molding tool may expand at a faster rate than the molding tool. The expansion of the mandrel may correspondingly cause expansion of the component material applied or laid onto the mandrel. In addition, the mandrel may apply pressure to the component material against interior surfaces of the molding tool, thereby compressing and curing, e.g., by application of heat and pressure, the component material into the component. In example embodiments, various combinations of curing temperatures, curing pressures, and/or curing times may be determined and used based at least in part on properties of the component material.

After completion of the expansion, compression, and curing of the component material, the process 600 may continue by stopping the application of heat to the closed molding tool and/or the mandrel, as at 616, and by opening the molding tool, as at 618. Then, the process 600 may proceed by removing the component from the molding tool, as at 620, and by washing out the mandrel, or the thermally expanding material composition of the mandrel, from the component, as at 622. For example, the thermally expanding material composition may be water-soluble such that the expanding material composition may be washed out of the component using hot or warm, pressurized water.

As described herein, in example embodiments, the expansion of the mandrel due to application of heat may initiate at least partial breakage or fracturing of the thermally expanding particles from each other. In addition, the cooling of the mandrel may further cause breakage or fracturing of the thermally expanding particles from each other, at least partially due to their reduction in size as a result of cooling. Further, the application of hot, pressurized water may dissolve the binder material and cause additional, e.g., complete or nearly complete, breakage or fracturing of the thermally expanding particles from each other. In this manner, the thermally expanding particles and water-soluble binder material may be washed out of the component using water.

Then, the process 600 may continue by recycling the material composition for the mandrel, as at 624. For example, the thermally expanding particles may be recycled, e.g., using a centrifuge or other filtering processes, and reused to form other thermally expanding mandrels. Furthermore, the binder material may also be recycled, e.g., using a plaster trap or other filtering processes, and also reused to form other thermally expanding mandrels. The process 600 may then end, as at 626.

In example embodiments in which the component formed by the process 600 also includes one or more foam material compositions, one or more resin coatings, and/or one or more support materials, as described herein, the process 600 may also include one or more of the steps described with respect to processes 200, 400, such as preparation of the foam material composition, injection of the foam material composition, preparation of the resin coating material, application of the resin coating material, insertion of one or more support materials, expansion and curing of the foam material composition, and/or curing of the resin coating material, as described herein.

The component formed using a thermally expanding mandrel by the process 600 described herein may include any desired shape, form, or geometry. Because the expanding material composition of the thermally expanding mandrel may be broken down, dissolved, and washed out of the component, a conventional mandrel having a fixed shape need not be removed from the interior of the component after completion of the process. Furthermore, the component may be formed with various surface features on interior surfaces and/or exterior surfaces based at least in part on corresponding surface features included on the thermally expanding mandrel and/or the molding tool. Moreover, while the example embodiments have been described herein in the context of a single, thermally expanding mandrel used to form a component, multiple thermally expanding mandrels of any desired shapes, forms, or geometries may be used together to form components with complex shapes, forms, and geometries including one or more negative space spars in any combination or arrangement. Further, any of the various features described herein with respect to any of the figures and example embodiments may be combined in various combinations.

All or portions of the process 600 described herein may be performed by automated or semi-automated machinery that is controlled and/or programmed to perform one or more steps of the process 600. For example, automated or semi-automated machinery or robotics may prepare the molding tool. Further, automated or semi-automated machinery or robotics may prepare the material composition for the thermally expanding mandrel, may form the mandrel using the material composition, and/or may apply component material to the mandrel and/or the molding tool. In addition, automated or semi-automated machinery or robotics may insert the thermally expanding mandrel into the molding tool, and/or may close the molding tool. Further, automated or semi-automated machinery or robotics may apply heat to the closed molding tool and/or the thermally expanding mandrel to expand the mandrel, and compress and cure the component material, and/or may stop applying heat to the closed molding tool and/or the thermally expanding mandrel. Moreover, automated or semi-automated machinery or robotics may open the molding tool upon completion, and/or may remove the component from the molding tool. Furthermore, automated or semi-automated machinery or robotics may wash out the thermally expanding mandrel from the component, and/or may recycle the thermally expanding material composition for the mandrel.

Each process described herein may be implemented by various architectures described herein or by other architectures. The processes are illustrated as a collection of blocks in a logical flow. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process. Additionally, one or more of the operations may be considered optional and/or not utilized with other operations.

Those skilled in the art will appreciate that, in some implementations, the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners.

The various processes and systems as illustrated in the figures and described herein represent example implementations. The processes and systems may be implemented in software, hardware, or a combination thereof in other implementations. Similarly, the order of any process may be changed, and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the features recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A method of manufacturing a component, comprising:
    forming a thermally expanding mandrel using an expanding material composition, wherein the expanding material composition comprises rubber particles and plaster, wherein the thermally expanding mandrel includes at least one surface feature that forms a corresponding surface feature on an interior surface of the component which is defined by a variation in a wall thickness of the component, and wherein the at least one surface feature of the thermally expanding mandrel includes at least one of a protrusion, bump, indentation, or dimple;
    applying carbon fiber component material to the thermally expanding mandrel;
    inserting the thermally expanding mandrel into a molding tool;
    closing the molding tool;
    applying heat to the thermally expanding mandrel and the molding tool during a period of time, wherein the thermally expanding mandrel expands and the carbon fiber component material cures to form the component including the corresponding surface feature on the interior surface of the component during the period of time;
    opening the molding tool after the period of time;
    removing the component from the molding tool; and
    washing out the thermally expanding mandrel from the component.

2. The method of claim 1, wherein washing out the thermally expanding mandrel comprises washing out the thermally expanding mandrel with water.

3. The method of claim 1, further comprising:
    recycling at least a portion of the expanding material composition after the washing out.

4. The method of claim 1, wherein forming the thermally expanding mandrel comprises at least one of molding the thermally expanding mandrel, 3-D printing the thermally expanding mandrel, or machining the thermally expanding mandrel.

5. A method, comprising:
    forming a thermally expanding mandrel using an expanding material composition, wherein the expanding material composition comprises thermally expanding particles and binder material, wherein the thermally expanding mandrel includes at least one surface feature that forms a corresponding surface feature on an interior surface of a component which is defined by a variation in a wall thickness of the component, and wherein the at least one surface feature of the thermally expanding mandrel includes at least one of a protrusion, bump, indentation, or dimple;
    applying component material to the thermally expanding mandrel;
    inserting the thermally expanding mandrel into a molding tool; and
    applying heat to at least one of the thermally expanding mandrel or the molding tool during a period of time, wherein the thermally expanding mandrel expands and the component material cures to form the component including the corresponding surface feature on the interior surface of the component during the period of time; and
    wherein the expanding material composition is configured to at least one of fracture or dissolve to facilitate removal from the component.

6. The method of claim 5, further comprising:
    removing the component from the molding tool;
    washing out the thermally expanding mandrel from the component; and
    recycling at least a portion of the expanding material composition.

7. The method of claim 5, wherein the thermally expanding particles include at least one of micronized rubber particles or silicone rubber particles, and the binder material includes gypsum plaster.

8. The method of claim 5, wherein the binder material is a water-soluble binder material.

9. The method of claim 5, wherein the component material includes at least one of carbon fiber strips or carbon fiber tape.

10. The method of claim 5, wherein a material of the molding tool includes at least one of aluminum, carbon, steel, or Inconel.

11. The method of claim 5, wherein a coefficient of thermal expansion associated with the thermally expanding particles is greater than a coefficient of thermal expansion associated with a material of the molding tool.

12. The method of claim 5, wherein the at least one surface feature of the thermally expanding mandrel further includes at least one of a corrugation, rib, or striation.

13. The method of claim 5, wherein the heat applied to the thermally expanding mandrel generates approximately 10% overpressure within the molding tool.

14. The method of claim 5, wherein forming the thermally expanding mandrel comprises at least one of molding the thermally expanding mandrel, 3-D printing the thermally expanding mandrel, or machining the thermally expanding mandrel.

15. A thermally expanding mandrel, comprising:
an expanding material composition including thermally expanding particles and binder material; and
at least one surface feature that forms a corresponding surface feature on an interior surface of a component formed within a molding tool, the at least one surface feature including at least one of a protrusion, bump, indentation, or dimple and is defined by a variation in a wall thickness of the component;
wherein the thermally expanding mandrel is formed in a desired shape to expand and form the component including the corresponding surface feature on the interior surface of the component within the molding tool; and
wherein the expanding material composition is configured to at least one of fracture or dissolve to facilitate removal from the component.

16. The mandrel of claim 15, wherein the thermally expanding particles include at least one of micronized rubber particles or silicone rubber particles, and the binder material includes water-soluble binder material.

17. The mandrel of claim 15, wherein a coefficient of thermal expansion associated with the thermally expanding particles is greater than a coefficient of thermal expansion associated with a material of the molding tool.

18. The mandrel of claim 15, wherein the at least one surface feature further includes at least one of a corrugation, rib, or striation.

19. The mandrel of claim 15, wherein the thermally expanding mandrel is formed in the desired shape by at least one of molding, 3-D printing, or machining.

* * * * *